United States Patent [19]

Masaki et al.

[11] Patent Number: 4,713,261

[45] Date of Patent: Dec. 15, 1987

[54] METHOD FOR PREPARING FERROMAGNETIC IRON OXIDE PARTICLES

[75] Inventors: Kouichi Masaki; Tatsuji Kitamoto, both of Kanagawa, Japan

[73] Assignee: Fuji Photo Film Co., Ltd., Kanagawa, Japan

[21] Appl. No.: 928,352

[22] Filed: Nov. 10, 1986

[30] Foreign Application Priority Data

Nov. 8, 1985 [JP] Japan .................................. 60-249019

[51] Int. Cl.$^4$ ............................................. B05D 5/12
[52] U.S. Cl. .................................. 427/129; 252/62.56;
427/127; 427/128; 427/130; 427/131; 427/132

[58] Field of Search ............... 427/127, 132, 128, 129, 427/130, 131; 252/62.56

[56] References Cited

U.S. PATENT DOCUMENTS 4,188,302  2/1980  Becker et al. .................. 427/127 X Primary Examiner—Bernard D. Pianalto
Attorney, Agent, or Firm—Sughrue, Mion, Zinn, Macpeak & Seas

[57] ABSTRACT

A method for preparing ferromagnetic iron oxide particles is described, which comprises depositing a cobalt compound onto a surface of lepidocrostie ($\gamma$-FeOOH) particles, and then calcining the particles at 150° to 350° C.

6 Claims, No Drawings

METHOD FOR PREPARING FERROMAGNETIC IRON OXIDE PARTICLES

FIELD OF THE INVENTION

The present invention relates to a method for preparing ferromagnetic particles used for a magnetic recording medium, and more particularly it relates to a method for preparing Co-modified ferromagnetic iron oxide particles.

BACKGROUND OF THE INVENTION

A so-called Co-added type ferromagnetic iron oxide is used as ferromagnetic particles suitable for a magnetic recording medium such as a video tape and the like. The Co-added type iron oxide can be made by preparing acicular iron oxide particles (although the term "acicular iron oxide particles" as used herein mainly means "$\gamma$-$Fe_2O_3$", partly means also "$Fe_3O_4$"), for example, obtained by adsorbing amorphous cobalt compounds such as cobalt hydroxide ($Co(OH)_2$) onto acicular iron oxyhydroxide ($\alpha$-FeOOH, hereinafter called "goethite"), washing with water, filtering, drying and calcining The calcining step generally is conducted at comparatively high temperature such as 300° to 500° C., and includes a dehydration step, a reduction step which results in the formation of $Fe_3O_4$, and, if desired, an oxidation step which results in the formation of $\gamma$-$Fe_2O_3$. During calcining, the cobalt ions diffuse into the acicular iron oxide particles that are being formed. Hereinafter, the above method is referred to as the "Co-doped method" as described in U.S. Pat. Nos. 4,297,395 and 3,903,004.

The process of the Co-doped method is comparatively simple and has comparatively low manufacturing cost, but it has a number of defects, such as dependence on temperatures is high, for example, Hc (coercive force) changes about 100 Oe with a 10° C. difference, demagnetization occurs to a great extent when pressure is applied or when heating takes place, and a print through phenomenon that signals recorded on a part of the magnetic layer are transferred on the other part easily occurs in a magnetic recording medium prepared by using the above-described magnetic particles.

In order to overcome these defects, it has recently been proposed and disclosed, for example, in Japanese Patent Publication Nos. 49475/74 and 29157/75, and Japanese Patent Application (OPI) Nos. 74399/74 and 37667/75 (the term "OPI" as used herein refers to a "published unexamined Japanese patent application") and U.S. Pat. No. 4,122,216 that $\gamma$-$Fe_2O_3$ particles are coated with Co, or are modified by Co to prepare a ferromagnetic iron oxide instead of diffusing Co into $\gamma$-$Fe_2O_3$ particles.

These magnetic particles are prepared by first forming an acicular magnetic iron oxide (mainly $\gamma$-$Fe_2O_3$), water washing, filtering, drying and calcining (dehydration, reduction and, if desired, oxidation) an aqueous suspension of, for example, acicular goethite particles, and then adding water-soluble cobalt salts, ferrous salts and alkali and the like into the aqueous suspension thereof, which is called a wet reaction. Hereinafter, this method is referred to as the "Co-modified method".

The Co-modified ferromagnetic iron oxide particles prepared by the above Co-modified method have such favorable characteristics that these iron oxide particles have high coercive force, dependence on temperatures is low (i.e., there is about a 20 Oe change with a 10° C. difference), demagnetization caused by adding pressure or by heating is low, and there is hardly any print through phenomenon. However, the manufacturing process is complicated, the manufacturing time is long and the manufacturing cost becomes also high, because as is clear from the above-described process, acicular magnetic iron oxide (mainly $\gamma$-$Fe_2O_3$) is first formed, and then is Co-modified by the wet reaction.

SUMMARY OF THE INVENTION

Accordingly, an object of the present invention is to provide a method for preparing Co-modified ferromagnetic iron oxide particles having the same excellent characteristics as those prepared by the above-described Co-modified method, and in a similar simple manner to that of the above-described Co-doped method.

In accordance with the above-described Co-doped method, calcination is conducted at a comparatively high temperature such as at 300° C. to 500° C., whereby Co ions are diffused into $\gamma$-$Fe_2O_3$ and the thus-obtained particles become Co-doped iron oxide particles. Accordingly, Co-modified iron oxide particles cannot be obtained. In this connection, the inventors of the present invention made extensive studies as to a method for preparing Co-modified iron oxide particles at a comparatively low calcining temperature in a similar simple manner to that of the Co-doped method, and as a result, they found that the above-described object can be attained by using lepidocrosite ($\gamma$-FeOOH). That is, the inventors of the present invention have found a method for preparing ferromagnetic iron oxide particles which comprises depositing a cobalt compound onto a surface of lepidocrosite ($\gamma$-FeOOH) particles, and then calcining the particles at 150 to 350° C.

DETAILED DESCRIPTION OF THE INVENTION

The present invention is illustrated hereinafter in more detail.

It is known in J. Appl. Phys., 39 (2) 1261–1263 (1968) that $\gamma$-$Fe_2O_3$ can be prepared by heating and dehydrating lepidocrosite. However, the thus-obtained $\gamma$-$Fe_2O_3$ is not suitable as a ferromagnetic iron oxide which can be used for a magnetic recording medium. The inventors of the present invention have found that Co-modified $\gamma$-$Fe_2O_3$ can be prepared by depositing cobalt compound onto lepidocrosite, and then washing with water, filtering, drying and calcining at a comparatively low temperature such as 150° to 350° C.

That is, the present invention relates to a method for preparing ferromagnetic iron oxide particles which comprises depositing cobalt compounds onto lepidocrosite ($\gamma$-FeOOH) particles, and then calcining (dehydration and, if desired, reduction and oxidation) it at temperatures of 150° to 350° C.

The cobalt compounds used in the present invention may include $Fe^{++}$. An amount of $Fe^{++}$ is generally from 0.3 to 20 wt %, and preferably from 1 to 10 wt %, based on the cobalt compound.

The lepidocrosite ($\gamma$-FeOOH) used in the present invention can be synthesized by methods such as disclosed in Kiyama, *Particles and Particles Metallurgy*, 23 (3), pp. 77–84 (1976); Hashimoto et al., *Bulletin of Ceramics Association*, 86 (9), pp. 381–387 (1978); and Hamada et al., *Bull. Soc. Japan*, 49 (12), pp. 3695–3696 (1976).

In the present invention, the lepidocrosite particles can be used without surface treatment or lepidocrosite particles can be subjected to surface treatment to prevent cobalt ion from diffusing into $\gamma$-$Fe_2O_3$.

The lepidocrosite particles can be surface-treated by boiling in the reaction solution after a $\gamma$-FeOOH forming reaction is completed, or by heating in a heated water bath, or can be surface treated with an aqueous dispersion or an aqueous solution, of compounds such as $SiO_2$, $Al_2O_3$, sodium borate, ammonium phosphate, water glass and the like. Of these methods, the method using $SiO_2$, $Al_2O_3$, or ammonium phosphate is preferred.

The cobalt compounds are added to an aqueous suspension of the surface-untreated or treated lepidocrosite particles. An amount of the cobalt compounds is generally from 0.3 to 10 wt %, and preferably from 0.5 to 5 wt %. Examples of the cobalt compounds include cobalt hydroxide, $Co(NO_3)_2$, $CoCl_2$, cobalt ferrite, and cobalt sulfate. In this manner, cobalt compounds are deposited on the surface of the lepidocrosite particles. Then, the particles are washed with water, filtered, dried and calcined.

The calcination may be carried out by employing a dehydration step as the only step of the calcination. The calcination is carried out at 150° C. to 350° C., preferably 250° C. to 300° C. Uniform heating is desired for calcination and furnaces such as a kiln type furnace, a fluidized bed type furnace and a fluidized layer type furnace are preferably used.

In the calcination step of the present invention, reduction and reoxidation may be carried out, if desired, after dehydration. Reduction may be carried out in an atmosphere of $H_2$ and city gas (having the volume ratio of $H_2/CO$: 0.5 to 1.5/1.5 to 0.5), which may be mixed with organic compounds such as salts of fatty acids (e.g., a palm oil, a coconut oil or a morpholine). Oxidation may be carried out in the air. Both reduction and oxidation can be carried out generally from 150° to 350° C., and preferably from 200° to 250° C.

In accordance with the above-described method, Co-modified ferromagnetic iron oxide (mainly $\gamma$-$Fe_2O_3$) having similar high coercive force, low dependence on temperatures, low demagnetization caused by adding pressure, lack of the print through and the like to those of iron oxide particles obtained by the above-described Co-modified method can be obtained.

The magnetic particles obtained in the present invention can be used for a magnetic recording medium such as a video tape, an audio tape, a computer tape, a disc and the like.

The present invention is further illustrated by the following examples.

EXAMPLE 1

613 g of $FeSO_4 \cdot 7H_2O$ was dissolved into diluted sulfuric acid (the diluted sulfuric acid was prepared by adding 10 ml of 6 N $H_2SO_4$ to 25 l of distilled water) and nitrogen gas was introduced at a rate of 10 l/min for preventing the oxidation of $Fe^{++}$. Into the above $FeSO_4$ solution was added a solution which had been prepared by dissolving 150 g of NaOH in 5 l of pure water. Subsequently, 10 ml of a 1 N aqueous solution of disodium hydrogen phosphate was added thereto. The thus-obtained reaction solution was heated to 45° C., and oxidized in air which was introduced at a rate of 15 l/min. while stirring. After the reaction solution was stabilized to maintain a pH of 4 for 2.5 hours, the reaction solution was oxidized for 10 minutes by air, and the reacted product was washed with water and separated by filtration.

A part of the reacted product was dried and subjected to X-ray diffraction to find that the reacted product was a single phase of $\gamma$-FeOOH.

A cake (Cake 1) corresponding to 30 g of the reacted product in a dry state was taken out and added to 0.5 l of water to obtain a slurry. While stirring, into the slurry was added a solution which had been prepared by dissolving 3.4 g of $CoSO_4 \cdot 7H_2O$ in 0.2 l of water. Subsequently, a solution which had been prepared by dissolving 1/1 g of NaOH in 0.2 l of water was added thereto for depositing $Co(OH)_2$, and the resulting mixture was heated to 60° C., allowed to stand for 30 minutes, and then the reacted product was washed with water, filtered and dried.

The thus-obtained $Co(OH)_2$ deposited $\gamma$-FeOOH was calcined under the following conditions, and the magnetic properties (Hc, $\sigma_s$) and demagnetization caused by adding pressure were measured. The results are shown in Table 1.

TABLE 1

| No. | Conditions of Calcination | Hc (Oe) | $\sigma_s$ (emu/g) | Demagnetization |
|---|---|---|---|---|
| 1-1 | Dehydration in air for 1 hour at 200° C. | 400 | 50 | 5 |
| 1-2 | Dehydration in air for 1 hour at 250° C. | 535 | 57 | 7 |
| 1-3 | Dehydration in air for 1 hour at 300° C. | 570 | 60 | 7 |
| 1-4 | Dehydration in air for 1 hour at 350° C. | 600 | 62 | 10 |
| 1-5* | Dehydration in air for 1 hour at 400° C. | 650 | 65 | 20 |
| 1-6 | Reduction in $H_2$ for 1 hour at 250° C. and then oxidation in air for 1 hour at 250° C. | 540 | 65 | 7 |
| 1-7 | Reduction in $H_2$ for 1 hour at 300° C. and oxidation in air for 1 hour at 250° C. | 610 | 68 | 10 |

Remarks:
*Comparative Example

EXAMPLE 2

A cake corresponding to 30 g of the obtained $\gamma$-FeOOH in a dried state prepared in the same manner as Cake 1 in Example 1 was taken out and was added to 0.5 l of water to obtain a slurry. While stirring, nitrogen gas was introduced thereto at a rate of 10 l/min for preventing the oxidation of $Fe^{++}$. Then, a solution containing 3.4 g of $CoSO_4 \cdot 7H_2O$ dissolved in 0.1 l of water, a solution containing 8 g of $FeSO_4 \cdot 7H_2O$ dissolved in 0.1 l of water, and a solution containing 44 g of NaOH dissolved in 0.2 l of water, were added thereto for depositing $Co(OH)_2$ successively in this order. Then, while nitrogen gas was introduced thereto, the resulting mixture was heated to 100° C., allowed to stand for 3 hours, the reacted product was washed with water, filtered and dried. The thus-obtained cobalt compound deposited $\gamma$-FeOOH was calcined under the following conditions, and the magnetic properties (Hc, $\sigma_s$) and demagnetization caused by adding pressure were measured. The results are shown in Table 2.

TABLE 2

| No. | Conditions of Calcination | Hc (Oe) | $\sigma_s$ (emu/g) | Demagnetization |
|---|---|---|---|---|
| 2-1 | Dehydration in air for 1 hour at 200° C. | 380 | 55 | 4 |
| 2-2 | Dehydration in air for 1 hour at 250° C. | 520 | 60 | 5 |
| 2-3 | Dehydration in air for 1 hour at 300° C. | 550 | 66 | 7 |
| 2-4 | Dehydration in air for 1 hour at 350° C. | 600 | 68 | 10 |
| 2-5* | Dehydration in air for 1 hour at 400° C. | 660 | 70 | 18 |
| 2-6 | Reduction in H₂ at 250° C. for 1 hour and oxidation in air at 250° C. for 1 hour | 560 | 70 | 7 |
| 2-7 | Reduction in H₂ at 300° C. for 1 hour and oxidation in air at 250° C. for 1 hour | 620 | 72 | 10 |

Remarks:
*Comparative Example

EXAMPLE 3

A cake corresponding to 30 g of the obtained $\gamma$-FeOOH in a dry state prepared in the same manner as Cake 1 in Example 1 was dispersed in 0.5 l of water and, while stirring, a solution containing 3.5 g of $CoSo_4 \cdot 7H_2O$ dissolved in 0.2 l of water, a solution containing 1.1 g of NaOH dissolved in 0.2 l of water, and a solution wherein 0.5 g of sodium oleate heated to 60° C. and allowed to stand for 30 minutes had been dissolved in 0.1 l of water, were added thereto for depositing Co(OH)₂ successively in this order in order to adsorb sodium oleate. Then, the reacted product was washed with water and dried. The thus-obtained Co(OH)₂ deposited $\gamma$-FeOOH was subjected to a heat treatment in nitrogen, and oxidation in air. Then, the magnetic characteristics and demagnetization caused by adding pressure were measured. The results are shown in Table 3.

TABLE 3

| No. | Conditions of Calcination | Hc (Oe) | $\sigma_s$ (emu/g) | Demagnetization |
|---|---|---|---|---|
| 3-1 | After being maintained in N₂ at 250° C. for 1 hour, oxidation in air at 250° C. for 1 hour | 530 | 62 | 4 |
| 3-2 | After being maintained in N₂ at 300° C. for 1 hour, oxidation in air at 250° C. for 1 hour | 580 | 68 | 5 |
| 3-3 | After being maintained in N₂ at 350° C. for 1 hour, oxidation in air at 250° C. for 1 hour | 620 | 68 | 10 |

EXAMPLE 4

400 g of $FeCl_2 \cdot nH_2O$ were dissolved in 25 l of water and N₂ at a rate of 10 l/min was introduced thereto. While stirring, an aqueous ammonium solution of 5 wt % was added to adjust the pH to 6.5±0.2 at 25° C. Air was passed through a 1 N aqueous solution of sodium hydroxide in order to remove CO₂, and the solution was oxidized in air which was introduced at a rate of 20 l/min. 2.24 l of an aqueous ammonium solution of 5 wt % was consumed for forming Co(OH)2 and the reaction was completed in 30 minutes. A part of the reacted product was dried and subjected to X-ray diffraction to find $\gamma$-FeOOH containing a slight amount of $\gamma$-FeOOH. After washing with water and filtering the reacted product, the cake was divided into four parts to obtain four slurry. Each of these cakes was subjected to a surface treatment. One cake was surface-treated with water glass, another with Al₂O₃, another with aluminum phosphate and another with sodium borate. The wet cake corresponding to 10 g in a dried state was dispersed in 200 ml of water, and while stirring, a solution where 1 g of $CoSO_4 \cdot 7H_2O$ had been dissolved in 50 ml of water and a solution where 0.5 g of NaOH had been dissolved in 50 ml of water were added thereto for depositing Co(OH)₂ successively. And then the mixture was allowed to stand at 60° C. for 30 minutes. The thus-obtained Co(OH)₂ deposited $\gamma$-FeOOH was reduced in H₂ at 300° C. for 1 hour and oxidized in air at 250° C. The magnetic characteristics and demagnetization caused by adding pressure were measured. The results are shown in Table 4.

TABLE 4

| No. | Surface-Treated Layer | Hc (Oe) | $\sigma_s$ (emu/g) | Demagnetization |
|---|---|---|---|---|
| 4-1 | Water glass (5 wt % based on $\gamma$-FeOOH) | 610 | 69 | 5 |
| 4-2 | Al₂O₃ (3 wt % based on $\gamma$-FeOOH) | 575 | 70 | 7 |
| 4-3 | Aluminum phosphate (3 wt % based on $\gamma$-FeOOH) | 625 | 69 | 7 |
| 4-4 | Sodium borate (2 wt % based on $\gamma$-FeOOH) | 580 | 72 | 7 |

In the above examples, demagnetization caused by adding pressure was measured in the following method.

Measurement of Demagnetization

Magnetic particles were coated to obtain a sheet, which was subjected to orientation and dried. The thus-obtained samples were set on VSM (vibrating sample magnetometer manufactured by Toei Kogyo Co., Ltd.) and subjected to saturation magnetization by applying a magnetic field fo 5 kOe. These samples were pressed with 2 tons/cm by an oil pressure and the residual magnetization ($\phi_1$) was measured. After the measurement, the samples were again subjected to the saturated magnetization by applying a magnetic field of 5 kOe, and the residual magnetization ($\phi_0$) was measured. The demagnetization was calculated by the following equation.

$$\text{Demagnetization (\%)} = \frac{\phi_0 - \phi_1}{\phi_0} \times 100$$

Measurement of Coercive Force (Hc), and Saturation Magnetization ($\sigma_s$)

The weight of the samples was measured, and then the hysteresis curve (B-H curve) of the samples was measured by the VSM.

As a result, Hc represents a strength of a magnetic field which is obtained when the magnetization is equal to 0. And $\sigma_s$ (emu/g) represents a value obtained by dividing the maximum magnetization strength ($M_s$) by the weight of the samples.

In accordance with the present invention, Co-modified ferromagnetic iron oxide particles having high coercive force and low demagnetization caused by adding pressure similar to those obtained by Co-modified method can be obtained at a relatively low calcining temperature in the same simple manner as in the Co-doped method.

While the invention has been described in detail and with reference to specific embodiments thereof, it will be apparent to one skilled in the art that various changes and modifications can be made therein without departing from the spirit and scope thereof.

What is claimed is:

1. A method for preparing ferromagnetic iron oxide particles which comprises depositing a cobalt compound onto a surface of lepidocrosite ($\gamma$-FeOOH) particles, and then calcining the particles at 150° C. to 350° C.

2. A method for preparing ferromagnetic iron oxide particles as in claim 1 wherein the lepidocrosite particles are calcined at 250° C. to 300° C.

3. A method for preparing ferromagnetic iron oxide particles as in claim 1 wherein the cobalt compound contains $Fe^{++}$.

4. A method for preparing ferromagnetic iron oxide particles as in claim 1 wherein the lepidocrosite particles are surface-treated with an aqueous dispersion or an aqueous solution, of compounds selected from the group consisting of $SiO_2$, $Al_2O_3$, sodium borate, ammonium phosphate and water glass before the cobalt compound is deposited.

5. In method as in claim 1, wherein the lepidocrosite particles are calcined in the air or in an atmosphere comprising nitrogen gas as a major component.

6. In method as in claim 1, wherein the lepidocrosite particles are calcined in the air.

* * * * *